United States Patent [19]

Shaw et al.

[11] Patent Number: 5,434,524

[45] Date of Patent: Jul. 18, 1995

[54] METHOD OF CLOCKING INTEGRATED CIRCUIT CHIPS

[75] Inventors: Robert R. Shaw; David T. Shen, both of Poughkeepsie, N.Y.

[73] Assignee: International Business Machines Corporation, Armonk, N.Y.

[21] Appl. No.: 945,477

[22] Filed: Sep. 16, 1992

[51] Int. Cl.⁶ .............................................. H03K 3/42
[52] U.S. Cl. ................................................... 327/187
[58] Field of Search ............ 307/260, 269, 303, 303.1, 307/298; 359/107, 108, 109, 163, 189; 257/81, 84; 250/214 LS; 327/187

[56] References Cited

U.S. PATENT DOCUMENTS

| | | | |
|---|---|---|---|
| 4,257,058 | 3/1981 | Ferro et al. | 257/116 |
| 4,695,871 | 9/1987 | Tsunoda et al. | 257/680 |
| 4,711,997 | 12/1987 | Miller | 250/216 |
| 4,939,569 | 7/1990 | Fine | 257/681 |
| 4,959,533 | 9/1990 | Yamazaki et al. | 250/208.1 |
| 5,045,680 | 9/1991 | Fan et al. | 250/214 LS |
| 5,049,981 | 9/1991 | Dahringer | 257/718 |
| 5,068,713 | 11/1991 | Toda | 257/680 |
| 5,068,714 | 11/1991 | Seipler | 257/703 |
| 5,250,816 | 10/1993 | Kitamura | 257/81 |
| 5,295,010 | 3/1994 | Barnes et al. | 359/107 |

FOREIGN PATENT DOCUMENTS

| | | |
|---|---|---|
| 508613A1 | 3/1992 | European Pat. Off. . |
| 58-138069 | 8/1983 | Japan . |
| 62-290144 | 12/1987 | Japan . |
| 1091478 | 4/1989 | Japan . |
| 1293569 | 11/1989 | Japan . |

OTHER PUBLICATIONS

B. D. Clymer, et al., "Optical Clock Distribution to Silicon Chips" Optical Engineering, vol. 25, #10, pp. 1103–1108, Oct. 1986.

S. J. Walker, et al., "Optical Clock Distribution Using Integrated Free-Space Optics" Optics Communications, vol. 90, #4,5,6, pp. 359–371, Jun. 15, 1990.

Primary Examiner—Willis R. Wolfe, Jr.
Attorney, Agent, or Firm—Charles W. Peterson, Jr.

[57] ABSTRACT

A method of clocking integrated circuit chips. A pulsed laser striking an integrated circuit module substrate is diffused through the substrate and exits the opposite surface as diffused light pulses. An integrated circuit chip mounted on the top surface of the substrate has optical receivers. The optical receivers receive pulsed energy from the diffused light pulses, converting pulsed light to electrical pulses that clock the chip.

3 Claims, 3 Drawing Sheets

METHOD OF CLOCKING INTEGRATED CIRCUIT CHIPS

FIELD OF THE INVENTION

The present invention is related generally to clocking integrated circuit chips in particular to methods of optically clocking integrated circuit chips.

BACKGROUND

Methods of electrically clocking integrated circuit chips are well known in the art. Typically, an integrated circuit chip mounted on a substrate has one or more chip pads dedicated to receiving electrical clock signals. A typical electrical clock signal path is: From an edge connector pin on a printed circuit board; over printed circuit wiring; through a pin on a module substrate; over substrate wiring; to a pad in a chip mounting location where solder or a wire bond provides an electrical connection between the substrate and the chip. This electrical clock signal is connected to a receiver on the chip that drives and redistributes the clock on the chip.

Electrical clock distribution methods have several problems. First, while a clock signal may come to a single pin on the substrate from the printed circuit card, when the clock is distributed to different chips on the substrate, it does not reach all chips simultaneously because there is a different delay for each clock path. Since each clock path has a different delay, the clock edges reach different chips at slightly different times, therefore, the clock edges are skewed. Ideally, the clock edges should be unskewed for all chips, i.e., the edges reach every module chip simultaneously. Because the clock edges reach different chips at different times, skew causes timing variations for different chips on the same substrate. To compensate for skew in these prior art multi-chip modules, a settling time was added to offset the clock skew. The settling time, which sets the lower limit for a clock period, limits maximum clock frequency, thereby limiting circuit performance.

Skew problems aside, distributing the clock around the substrate to different chips is complicated. Usually the clock wiring must be distributed on several different wiring layers. Consequently, this complicated multi-layer clock wiring has: A high capacitive load resulting from the capacitance between wiring on the different layers; A high inductance loading; and suffers from transmission line effects, all of which exacerbate skew.

Electrically distributed clocks are also sensitive to electromagnetic noise. Electromagnetic noise coupled from adjacent substrate signal lines to the clock lines could cause noise spikes large enough to produce false clock pulses or ghosts. These false clock pulses may cause inadvertent changes in the chip's state. Since these pulses are inadvertent, they are hard to detect, nearly impossible to correct, and very often lead to intermittent timing errors. Intermittent timing errors have caused whole projects to be scrapped.

A second prior art approach to clock distribution is to route the clock optically through optical fibers on the substrate. An optical clock signal is directed through the optical fiber to an optical receiver on the chip. The receiver converts the optical clock signal to an electrical clock signal that is distributed on the chip. Although this approach solved the skew, distribution, and electromagnetic noise problems encountered with the electrical clock distribution, attaching optical fibers to the substrate also had drawbacks.

First, optical fibers use valuable wiring real estate. Typically, electrical wiring lands are 2 mils wide. An optical fiber is 6-12 mils. Thus, each optical fiber uses three or four wiring channels creating blockages in the wiring layer and reducing the number of available wiring channels. Consequently, the number of layers required to wire the other signals between chips is increased. Furthermore, optical fibers do not bend easily. Thus, routing optical clocks to multiple locations quickly becomes unfeasible. Attaching optical fibers to the substrate is difficult, expensive, and the substrates are not reworkable.

PURPOSES OF THE INVENTION

It is the purpose of the invention to reduce clocking skew for integrated circuit chips on a substrate.

It is another purpose of the invention to improve clock distribution on a substrate having multiple integrated circuit chips.

It is another purpose of the invention to simplify clock distribution on integrated circuit chip packages.

It is a purpose of the invention to reduce integrated circuit chip clock sensitivity to electromagnetic noise.

It is another purpose of the invention to reduce the cost of clocking integrated circuit chips using an optical clocking scheme.

It is another purpose of the invention to minimize the problems for electrical real estate associated with optical clocking schemes for integrated circuit chips.

SUMMARY OF THE INVENTION

The present invention is a method of clocking integrated circuit chips mounted on a substrate. A laser is pulsed at the intended clock rate. The pulsed laser strikes the bottom surface of the substrate. The laser passes through the substrate, pulsing optical receivers on one or more integrated circuit chips. Each receiver converts the laser pulses into electrical pulses that clock the chip.

DRAWINGS

DETAILED DESCRIPTION OF THE PREFERRED EMBODIMENT

Figure 1:
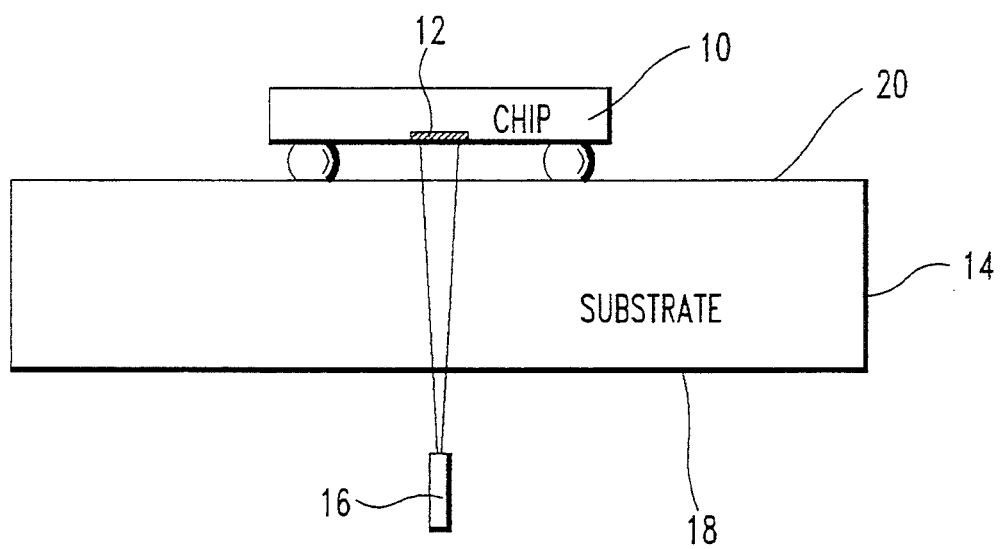
FIG. 1 is a diagramatic representation of the preferred embodiment of the present invention.

FIG. 1 diagramatically represents the integrated circuit chip clock assembly of the preferred embodiment of the present invention. An integrated circuit chip 10 with optical receivers 12 is mounted on a top surface 20 of a substrate 14. The substrate material may be glass ceramic or alumina ($AL_2O_3$). A pulsed laser 16 broadcasts pulses of monochromatic light at a bottom surface 18 of the substrate 14. The laser 16 pulse rate is the selected clock rate. The laser pulses striking the substrate surface penetrate the substrate 14 and are diffused through the substrate 14. Diffused light emerging from the top side 20 of the substrate 14 strikes the chip's optical receivers 12. Each optical receiver 12 converts the pulsed-diffused light to an electrical clock pulse. The clock (pulses) is (are) redistributed electronically to the integrated circuits on the chip 10. If more than one integrated circuit chips 10 are mounted on the substrate 14, then the diffused light pulses strike optical receivers 12 on every integrated circuit chip 10 simultaneously.

Figure 2:
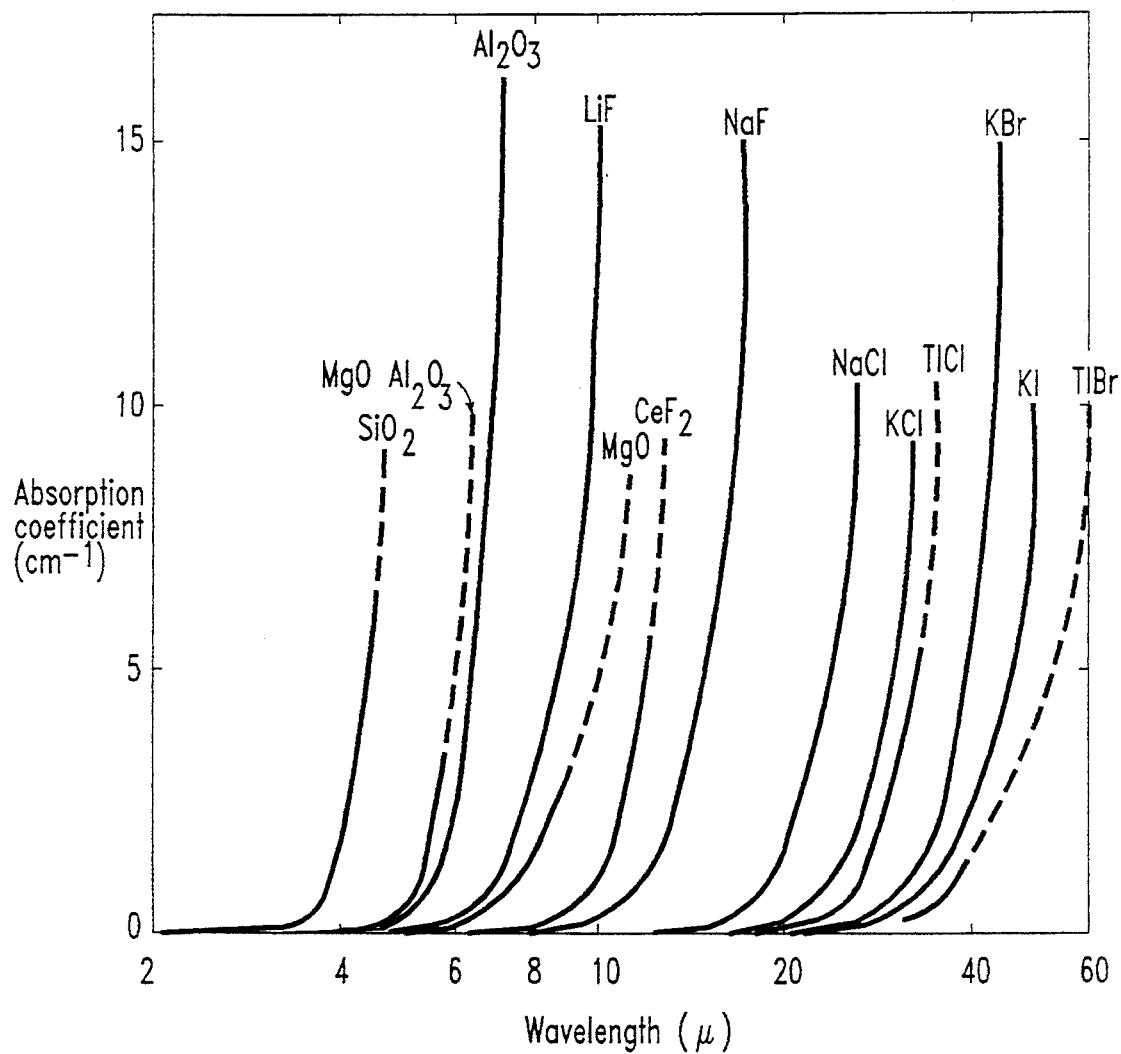
FIG. 2 shows the absorption edges for ionic crystalline substrate material.

The transmission medium (the substrate 14 material) must be of a material such that it passes enough diffused light from the pulsed laser 16 to the integrated circuit chip 10 sufficient to trigger the optical receiver 12. FIG. 2 shows the absorption edges for crystalline substrate materials. The laser wavelength must be chosen both to pass through the substrate with acceptable loss and to match the characteristic of the optical receiver (a function of silicon junction absorption). Typically, a loss of 99.99%, or less, is sufficient to trigger the optical receiver 12 and is, therefore, acceptable. Thus, for silicon based receivers, the preferred wavelength is between 400 and 1200 nm, as this wavelength has the best silicon junction absorption for triggering the receiver 12. Alumina, mullite, cordievite, and other ceramic substrates have no inherent absorption bands in this interval, and so are compatible substrate materials.

Figure 3:
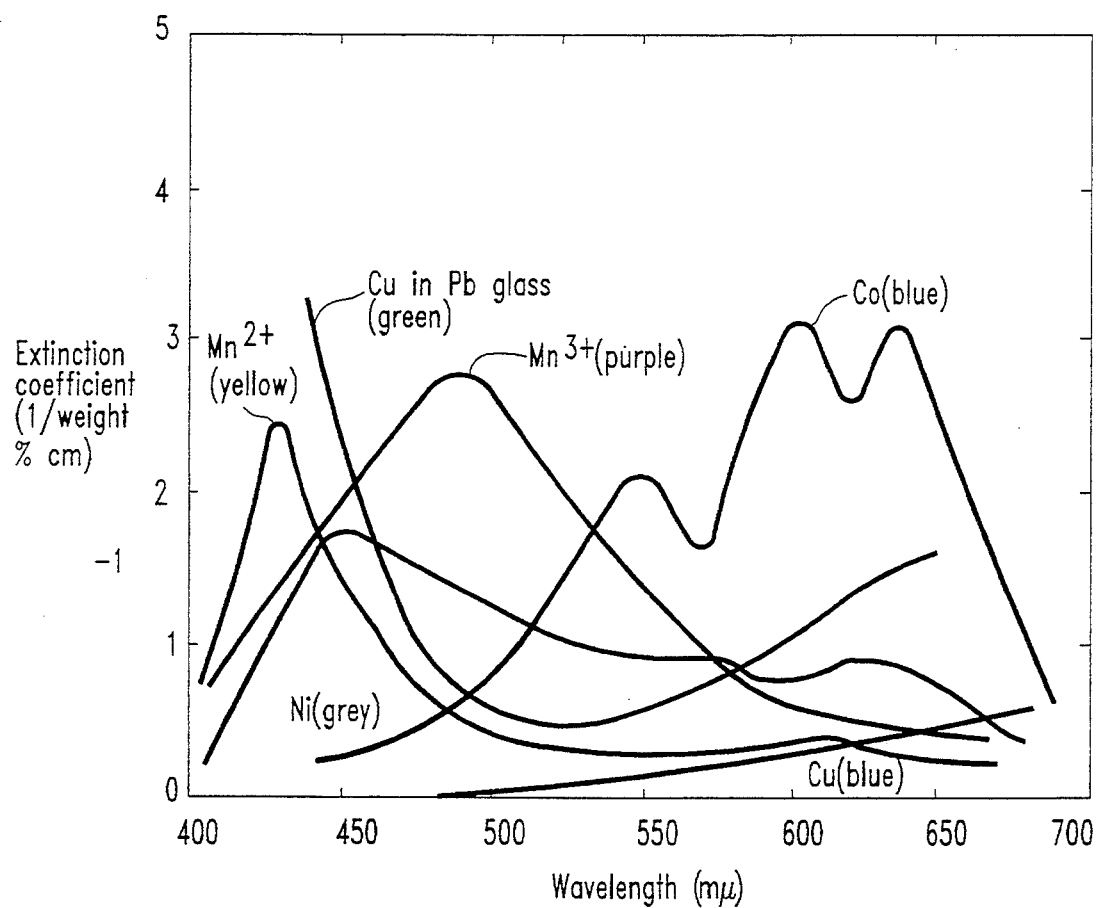
FIG. 3 shows the extinction coefficient verses light wavelength for several substrate dopant materials.

Additionally, if the substrate material has a strongly absorbing dopant, the substrate will be tinted, and so, the wavelength must be selected to avoid absorption by the dopant. FIG. 3 shows the absorption (extinction coefficient) of light (wavelength) for several dopants. For a substrate material with copper dopant, for example, the wavelength should be 400–500 nm.

There is no physical contact required between the laser 16 and the substrate 14. While the distance between the laser 16 and the substrate 14 is not critical, this distance should be chosen so that the laser beam dispersion is not so wide that insufficient light reaches the chip. However, it is preferred that the distance between the laser 16 and the substrate 14 be less than 1 cm. If the substrate has more than one chip 10 clocked by the laser 16, then the beam dispersion must be sufficient to irradiate all of the clocked chips.

Optionally, for a substrate with very dense signal wiring, small light vias may be left open to assure that the beam penetrates the substrate 14 to provide sufficient energy to the receiver.

Various modifications and alterations will occur to a person of ordinary skill in the art without departing from the scope and spirt of the present invention.

We claim:

1. A method of clocking at least one integrated circuit chip mounted on a substrate comprising broadcasting a pulsed laser at said substrate.

2. The method of claim 1 wherein said integrated circuit chips are on a top said substrate surface and said pulsed laser is broadcasted at a bottom said substrate surface.

3. The method of claim 1 wherein said integrated circuit chips are on a top said substrate surface and said pulsed laser is broadcasted at an edge of said substrate.

* * * * *